United States Patent
Mutsuda et al.

(10) Patent No.: US 12,472,667 B2
(45) Date of Patent: Nov. 18, 2025

(54) LAMINATE, METHOD FOR PRODUCING SAME, AND USE OF SAME

(71) Applicant: Polyplastics-Evonik Corporation, Tokyo (JP)

(72) Inventors: Mitsuteru Mutsuda, Tokyo (JP); Toshihiko Fujinaka, Tokyo (JP); Daisuke Fujiki, Tokyo (JP); Yoshiki Nakaie, Tokyo (JP)

(73) Assignee: POLYPLASTICS-EVONIK CORPORATION, Tokyo (JP)

( * ) Notice: Subject to any disclaimer, the term of this patent is extended or adjusted under 35 U.S.C. 154(b) by 381 days.

(21) Appl. No.: 18/013,142

(22) PCT Filed: Jun. 9, 2021

(86) PCT No.: PCT/JP2021/021820
§ 371 (c)(1),
(2) Date: Dec. 27, 2022

(87) PCT Pub. No.: WO2022/030098
PCT Pub. Date: Feb. 10, 2022

(65) Prior Publication Data
US 2023/0241816 A1  Aug. 3, 2023

(30) Foreign Application Priority Data
Aug. 7, 2020  (JP) .................... 2020-134446

(51) Int. Cl.
| | |
|---|---|
| *B29C 45/14* | (2006.01) |
| *B29C 45/00* | (2006.01) |
| *B29K 33/00* | (2006.01) |
| *B29K 77/00* | (2006.01) |
| *B29K 105/00* | (2006.01) |
| *B29L 31/10* | (2006.01) |
| *B29L 31/30* | (2006.01) |

(52) U.S. Cl.
CPC .... *B29C 45/14811* (2013.01); *B29C 45/0001* (2013.01); *B29K 2033/12* (2013.01); *B29K 2077/00* (2013.01); *B29K 2105/0002* (2013.01); *B29K 2105/0067* (2013.01); *B29L 2031/10* (2013.01); *B29L 2031/3005* (2013.01)

(58) Field of Classification Search
None
See application file for complete search history.

(56) References Cited

U.S. PATENT DOCUMENTS

| 5,637,408 A * | 6/1997 | Oenbrink .............. B32B 27/308 |
|---|---|---|
| | | 428/522 |
| 2010/0003534 A1 | 1/2010 | Luetzeler et al. |
| 2013/0318835 A1 | 12/2013 | Mutsuda et al. |
| 2021/0198541 A1 | 7/2021 | Mutsuda et al. |
| 2021/0308719 A1 | 10/2021 | Mutsuda et al. |

FOREIGN PATENT DOCUMENTS

| JP | 8-169095 A | 7/1996 |
|---|---|---|
| JP | 2001-150618 A | 6/2001 |
| JP | 2010-501380 A | 1/2010 |
| JP | 2011-110105 A | 6/2011 |
| JP | 2020-33456 A | 3/2020 |
| WO | WO 2020/032170 A1 | 2/2020 |

OTHER PUBLICATIONS

Extended European Search Report dated Nov. 13, 2023 for Application No. 21853519.3.
English translation of International Preliminary Report on Patentability and Written Opinion of the International Searching Authority for International Application No. PCT/JP2021/021820, dated Feb. 7, 2023.
English translation of International Preliminary Report on Patentability for International Application No. PCT/JP2021/021820, dated Feb. 16, 2023.
International Search Report for PCT/JP2021/021820 (PCT/ISA/210) mailed on Aug. 17, 2021.
Written Opinion of the International Searching Authority for PCT/JP2021/021820 (PCT/ISA/237) mailed on Aug. 17, 2021.

* cited by examiner

*Primary Examiner* — Sheeba Ahmed
(74) *Attorney, Agent, or Firm* — Birch, Stewart, Kolasch & Birch, LLP

(57) ABSTRACT

Prepared is a laminate including: a first layer formed of a first resin composition containing a first resin; and a second layer formed of a second resin composition containing a second resin, the first layer and the second layer being in contact with each other and integrated. The first resin includes an alicyclic polyamide resin having 20 mmol/kg or greater of amino groups, and the second resin includes an acid-modified (meth)acrylic resin. The second resin may have 100 mmol/kg or greater of carboxyl groups. The acid-modified (meth)acrylic resin may be an acid-modified polymethylmethacrylate resin. An average thickness of the first layer may be 0.15 times or more of an average thickness of the second layer. The average thickness of the first layer may be 200 μm or greater. When a weight is dropped onto the second layer side, the laminate may have a DuPont impact strength of 500 N/inch or greater. The laminate has excellent transparency, lightness, light resistance, and impact resistance.

12 Claims, No Drawings

LAMINATE, METHOD FOR PRODUCING SAME, AND USE OF SAME

TECHNICAL FIELD

The present disclosure relates to a laminate that can be used as a transparent molded article such as an automobile sunroof, a method for producing the same, and use of the same.

BACKGROUND ART

Transparent molded articles used outdoors, such as a sunroof, require lightness, light resistance, impact resistance, rigidity, and the like. Glass, polycarbonate, polymethylmethacrylate (PMMA) and the like are widely used as materials for such transparent molded articles. However, the glass has a disadvantage of having low lightness and impact resistance, the polycarbonate has a disadvantage of having low light resistance, and the polymethylmethacrylate has a disadvantage of having low impact resistance. Therefore, an attempt has been made to improve physical properties by layering a sheet formed of a plastic material.

JP 2008-213436 A (Patent Document 1) discloses a plastic polarizing lens body including a sheet-shaped polarizer having at least a polarization sheet, wherein a (meth)acrylate-based resin layer is formed on at least one surface of the sheet-shaped polarizer, and, further, a thermoformable resin such as a polyamide resin is thermally fused and layered at least on the (meth)acrylate-based resin layer by an injection molding method. Examples of the (meth)acrylate resin layer include ultraviolet curable compositions.

JP 2010-501380 A (Patent Document 2) discloses a multilayer sheet comprising: a layer made of a polyamide molding material; an inner layer made of a fixing agent; and a support body made of a polyalkyl(meth)acrylate molding material, wherein the inner layer contains from 5 to 100 mass % of a copolymer, and wherein the copolymer has from 70 to 99.9 mass % of a monomer unit derived from a vinyl compound selected from acrylic acid derivatives, methacrylic acid derivatives, α-olefins, and vinyl aromatics, and from 0.1 to 30 mass % of a monomer unit having a functional group selected from carboxylic acid anhydride groups, epoxy groups, and oxazoline groups. In the Examples, a sheet having a total thickness of 3 mm, in which 240 μm of a fixing agent layer and 180 μm of a polyamide layer are layered on a PMMA support body, is produced by insert molding lamination.

CITATION LIST

Patent Document

Patent Document 1: JP 2008-213436 A
Patent Document 2: JP 2010-501380 A

SUMMARY OF INVENTION

Technical Problem

However, the plastic polarizing lens body of Patent Document 1 has a complicated layer structure, and, besides, low steady contact between the (meth)acrylate resin layer and the lens body made of a thermoformable resin. Additionally, the multilayer sheet of Patent Document 2 has low impact resistance, and, besides, insufficient steady contact between the layer made of a polyamide molding material and the inner layer.

Thus, an object of the present invention is to provide a laminate having excellent transparency, lightness, light resistance and impact resistance, a method for producing the same, and use of the same.

Solution to Problem

To achieve the above object, the present inventors have made intensive studies and found that a first layer formed of a first resin composition containing an alicyclic polyamide resin having 20 mmol/kg or greater of amino groups, and a second layer formed of a second resin composition containing an acid-modified (meth)acrylic resin are in contact with each other and integrated, and thus that transparency, lightness, light resistance and impact resistance can be improved, and completed the present invention.

The laminate of the present disclosure is a laminate including a first layer and a second layer, the first layer being formed of a first resin composition containing a first resin, the second layer being formed of a second resin composition containing a second resin, the first layer and the second layer being in contact with each other and integrated, in which the first resin includes an alicyclic polyamide resin having 20 mmol/kg or greater of amino groups, and the second resin includes an acid-modified (meth)acrylic resin. The second resin may have 100 mmol/kg or greater of carboxyl groups. The acid-modified (meth)acrylic resin may be an acid-modified polymethylmethacrylate resin. An average thickness of the first layer may be 0.15 times or more of the average thickness of the second layer. The average thickness of the first layer may be 200 μm or greater. The laminate may have a DuPont impact strength of 500 N/inch or greater, when a weight is dropped onto the second layer side.

The present disclosure also encompasses a method for producing the laminate described above, including solidifying by bringing a first precursor for forming the first layer and a second precursor for forming the second layer into contact with each other in a state where at least one of the first precursor or the second precursor is molten to obtain a laminate.

The present disclosure also encompasses a molded article formed of the laminate. The molded article may be an automobile sunroof with the second layer disposed on an outdoor side.

The present disclosure also encompasses a method of using the laminate described above as a partition wall for separating indoors from outdoors, the method including disposing the second layer on the outdoor side.

Advantageous Effects of Invention

In the present disclosure, a first layer formed of a first resin composition containing an alicyclic polyamide resin having 20 mmol/kg or greater of amino groups, and a second layer formed of a second resin composition containing an acid-modified (meth)acrylic resin are in contact with each other and integrated, and thus transparency, lightness, light resistance and impact resistance can be improved. In particular, by layering, mechanical properties are improved as compared with a single layer, and the layers can be integrated without an adhesive layer, and thus discoloration due to the adhesive layer can be suppressed. Furthermore, since the laminate is strong against impact from the second layer side, the mechanical properties can be further improved by disposing the second layer on a side where strength is required. In addition, the second layer contains an acid-modified (meth)acrylic resin, and thus has high compatibility (wettability) with a general-purpose (meth)acrylic hard coat layer, and surface strength can be further improved by layering the hard coat layer on the second layer according to the intended use. The laminate also has high rigidity, and thus is suitable as an automobile sunroof (transparent window) or the like.

DESCRIPTION OF EMBODIMENTS

Laminate

A laminate of the present disclosure includes a first layer formed of: a first resin composition containing a first resin; and a second layer formed of a second resin composition containing a second resin.

First Layer

The first resin includes an alicyclic polyamide resin having 20 mmol/kg or greater of amino groups.

The alicyclic polyamide resin has 20 mmol/kg or greater of amino groups, and thus the steady contact between the first layer and the second layer can be improved. The reason why the steady contact can be improved is that the alicyclic polyamide resin has an amino group concentration that allows a sufficient reaction with the carboxyl group of the acid-modified (meth)acrylic resin contained in the second layer, and thus, the alicyclic polyamide resin and the acid-modified (meth)acrylic resin are sufficiently reacted with each other at an interface between the first layer and the second layer, resulting in firm integration between the first layer and the second layer. As a result, it may be supposed that the laminate of the present disclosure is lightweight but can have improved mechanical properties such as impact resistance and rigidity.

The amino group concentration $C_{NH2}$ (unit: mmol/kg) of the alicyclic polyamide resin may be 20 or greater, and is, for example, from 20 to 80, preferably from 25 to 80, further preferably from 30 to 70, more preferably from 30 to 60, and most preferably from 30 to 50. When the amino group concentration is excessively low, the steady contact with the second layer decreases. The amino group concentration may be a terminal amino group concentration, and is usually a terminal amino group concentration.

A concentration (unit: mmol/kg) of the carboxyl group (terminal carboxyl group) of the alicyclic polyamide resin is not particularly limited, and may be 200 or less, and is, for example, from 10 to 200, preferably from 30 to 160, further preferably from 40 to 130, more preferably from 50 to 120, and most preferably from 70 to 110.

In the alicyclic polyamide resin, a ratio of the amino group to the carboxyl group is not particularly limited. The ratio (molar ratio) of the amino group to the carboxyl group of the alicyclic polyamide resin is, for example, amino group/carboxyl group=from 15/85 to 100/0, preferably from 20/80 to 100/0, further preferably from 20/80 to 80/20, more preferably from 30/70 to 80/20, and most preferably from 35/65 to 70/30.

Note that, in the present specification and claims, the amino group concentration and the carboxyl group concentration can be measured by a commonly used method, for example, a titration method. Specifically, the amino group concentration can be measured by dissolving an alicyclic polyamide resin (sample) in a mixed solvent having a volume ratio of 10:1 of phenol and ethanol to prepare a 1 mass % solution, and then performing neutralization titration with a 1/100 N HCl aqueous solution. Also, the carboxyl group concentration can be measured by dissolving an alicyclic polyamide resin (sample) in benzyl alcohol to prepare a 1 mass % benzyl alcohol solution, and then performing neutralization titration with a 1/100 N KOH ethanol solution.

A number average molecular weight of the alicyclic polyamide resin is, for example, from 8000 to 200000, preferably from 9000 to 150000, and further preferably from 10000 to 100000. If the molecular weight is excessively small, the mechanical properties may be impaired, and, conversely, if the molecular weight is excessively large, productivity of the laminate may be impaired.

Note that, in the present specification and claims, the number average molecular weight of the alicyclic polyamide resin can be measured by a commonly used method. For example, from the perspective that an accurate molecular weight can be measured more easily, the number average molecular weight can be measured by gel permeation chromatography using polystyrene or the like as a standard substance when the alicyclic polyamide resin has a sealed terminal group or has a functional group other than the terminal group (such as when an additive having a functional group is contained), and the number average molecular weight can be calculated from an amount of the terminal group by a titration method when the alicyclic polyamide resin has no sealed terminal group and has no functional group other than the terminal group. When the amount of the terminal group is x mmol/kg, the number average molecular weight can be determined based on the formula: $1 \div (x/2) \times 1000000$.

A melting point of the alicyclic polyamide resin is, for example, from 150 to 350° C., preferably from 180 to 300° C., further preferably from 200 to 280° C., more preferably from 220 to 270° C., and most preferably from 230 to 260° C. If the melting point is excessively low, heat resistance may be impaired, and, conversely, if the melting point is excessively high, the productivity of the laminate may be impaired.

A glass transition temperature (Tg) of the alicyclic polyamide resin is, for example, from 30 to 250° C., preferably from 50 to 200° C., further preferably from 100 to 180° C., more preferably from 120 to 160° C., and most preferably from 130 to 150° C. If the glass transition temperature is excessively low, rigidity may be impaired, and, conversely, if the glass transition temperature is excessively high, the productivity of the laminate may be impaired.

Note that, in the present specification and claims, the melting point and glass transition temperature of the alicyclic polyamide resin can be measured by a differential scanning calorimeter (DSC), and when a plurality of peaks are shown by a DSC, the melting point refers to the temperature corresponding to the highest peak on the high temperature side of the plurality of peaks.

Examples of the alicyclic polyamide resin include a homopolyamide or copolyamide containing at least one type selected from alicyclic diamine components and alicyclic dicarboxylic acid components as a constituent component, and, for example, alicyclic polyamides obtained by using, of the diamine components and the dicarboxylic acid components, an alicyclic diamine and/or an alicyclic dicarboxylic acid as at least a part of the component can be used. In particular, as the diamine component and the dicarboxylic acid component, an aliphatic diamine component and/or an aliphatic dicarboxylic acid component are preferably used in combination with the alicyclic diamine component and/or the alicyclic dicarboxylic acid component, and a combination of the alicyclic diamine component and the aliphatic dicarboxylic acid component is particularly preferred. Such alicyclic polyamide resins are highly transparent and are known as so-called transparent polyamides.

Examples of the alicyclic diamine components include diaminocycloalkanes (such as diamino $C_{5-10}$ cycloalkanes), such as diaminocyclohexane; bis(aminocycloalkyl)alkanes such as bis(4-aminocyclohexyl)methane, bis(4-amino-3-methylcyclohexyl)methane, and 2,2-bis(4'-aminocyclohexyl)propane; and a hydrogenated xylylenediamine. The alicyclic diamine components may include a substituent, such as an alkyl group (a $C_{1-6}$ alkyl group, such as a methyl group and an ethyl group; preferably a $C_{1-4}$ alkyl group; and more preferably a $C_{1-2}$ alkyl group). These alicyclic diamine components can be used alone or in a combination of two or more.

Examples of the aliphatic diamine components include $C_{4-16}$ alkylenediamines such as tetramethylenediamine, hexamethylenediamine, and dodecanediamine.

Of these diamine components, alicyclic diamine components such as bis(aminocycloalkyl)alkanes are preferred, and bis(amino $C_{5-8}$ cycloalkyl)$C_{1-3}$ alkanes such as bis(4-aminocyclohexyl)methane are particularly preferred.

Examples of the alicyclic dicarboxylic acid components include cycloalkane dicarboxylic acids (such as $C_{5-10}$ cycloalkane-dicarboxylic acids), such as 1,4-cyclohexanedicarboxylic acid and 1,3-cyclohexanedicarboxylic acid.

Examples of the aliphatic dicarboxylic acid components include $C_{4-20}$ alkane-dicarboxylic acids such as adipic acid, sebacic acid, and dodecanedioic acid.

Among these dicarboxylic acid components, aliphatic dicarboxylic acid components such as $C_{6-18}$ alkane-dicarboxylic acids are preferred, and $C_{8-12}$ alkane-dicarboxylic acids such as dodecanedioic acid are particularly preferred.

Examples of representative alicyclic polyamide resins include condensates of an alicyclic diamine component [such as bis(aminocyclohexyl)alkane] and an aliphatic dicarboxylic acid component [such as an alkane dicarboxylic acid (for example, a $C_{4-20}$ alkane-dicarboxylic acid component)].

A proportion of the alicyclic polyamide resin in the first resin may be 50 mass % or greater, and is preferably 80 mass % or greater, further preferably 90 mass % or greater, more preferably 95 mass % or greater, and most preferably 100 mass %. If the proportion of the alicyclic polyamide resin is excessively small, impact resistance may be impaired.

The first resin may further include another resin in addition to the alicyclic polyamide resin. Another resin can be selected from general-purpose thermoplastic resins, but are preferably an aliphatic polyamide resin and an aromatic polyamide resin, from the perspective of compatibility and the like. A proportion of another resin in the first resin may be 50 mass % or less, preferably 20 mass % or less, further preferably 10 mass % or less, and more preferably 5 mass % or less.

A proportion of the first resin in the first resin composition may be 70 mass % or greater, preferably 80 mass % or greater, further preferably 90 mass % or greater, more preferably 95 mass % or greater, and most preferably 99 mass % or greater, and may be 100 mass %. If the proportion of the first resin is excessively small, impact resistance may be impaired.

The amino group concentration $C_{NH2}$ (unit: mmol/kg) of the first resin may be 20 or greater, and is, for example, from 20 to 80, preferably from 25 to 80, further preferably from 30 to 70, more preferably from 30 to 60, and most preferably from 30 to 50. When the amino group concentration is excessively low, the steady contact with the second layer decreases. The amino group concentration may be a terminal amino group concentration, and is usually a terminal amino group concentration.

The first resin composition may further contain commonly used additives in addition to the first resin. Examples of commonly used additives include stabilizers (heat resistant stabilizers, weather resistant stabilizers, antioxidants, ultraviolet absorbers, and the like), colorants, fillers, plasticizers, lubricants, flame retardants, antistatic agents, and silane coupling agents. These additives can be used alone or in a combination of two or more. A total proportion of these additives may be 30 mass % or less (for example, from 0.01 to 10 mass %) in the first resin composition.

The average thickness of the first layer is preferably 200 μm or greater from the perspective that lightness and impact resistance can be improved. In particular, the average thickness of the first layer can be appropriately selected according to the intended use, and is, for example, from 0.2 to 50 mm, preferably from 0.3 to 30 mm, further preferably from 0.5 to 20 mm, more preferably from 1 to 10 mm, and most preferably from 2 to 5 mm.

Second Layer

The second resin includes an acid-modified (meth)acrylic resin.

The (meth)acrylic resin constituting the acid-modified (meth)acrylic resin may be any polymer containing a (meth)acrylic monomer such as (meth)acrylic acid or (meth)acrylic acid ester, but is preferably a polymethylmethacrylate resin including a methyl methacrylate unit as a main component from the perspective that transparency, light resistance, and rigidity can be improved.

The polymethylmethacrylate resin (polymethylmethacrylate resin which is not modified with an acid) may further include another copolymerizable unit in addition to the methyl methacrylate unit.

Examples of monomers constituting another copolymerizable unit include methyl acrylate; (meth)acrylic acid $C_{2-12}$ alkyl esters such as ethyl (meth)acrylate, butyl (meth)acrylate, and 2-ethylhexyl (meth)acrylate; (meth)acrylic acid hydroxy $C_{2-4}$ alkyl esters such as 2-hydroxyethyl (meth)acrylate; cycloalkyl (meth)acrylates such as cyclohexyl (meth)acrylate; (meth)acrylate phenyl (meth)acrylate aryl esters; (meth)acrylic acid aralkyl esters such as benzyl (meth)acrylate; vinyl cyanides such as (meth)acrylonitrile; vinyl esters such as vinyl acetate and vinyl propionate; conjugated dienes such as butadiene and isoprene; aromatic vinyls such as styrene, vinyl toluene, α-methylstyrene, chlorostyrene and bromostyrene; olefins such as ethylene and propylene; maleic acid di $C_{1-6}$ alkyl esters such as dimethyl maleate; maleimides such as phenylmaleimide and cyclohexylmaleimide. These monomers may be used alone or in a combination of two or more. Of these, (meth)acrylic acid $C_{2-6}$ alkyl esters and aromatic vinyl monomers such as styrene are preferred.

A proportion of the methyl methacrylate unit in the polymethylmethacrylate resin may be, for example, 50 mol % or greater, preferably 70 mol % or greater, further preferably 80 mol % or greater, and more preferably 90 mol % or greater, and most preferably 100 mol %, in the entire monomer (monomer of a polymethylmethacrylate resin which is not modified with an acid). When the proportion of the methyl methacrylate unit is excessively small, transparency, light resistance, and rigidity may be impaired.

The acid-modified (meth)acrylic resin (particularly, acid-modified polymethylmethacrylate resin) may be any (meth)acrylic resin modified with a carboxylic acid, and is preferably a (meth)acrylic resin having a carboxyl group and/or an acid anhydride group, and particularly preferably a (meth)acrylic resin having a carboxyl group. A method for modification with an acid may involve introduction of a carboxyl group and/or an acid anhydride group in a backbone of the (meth)acrylic resin, and is not particularly limited. However, a method of introducing a monomer having a carboxyl group and/or an acid anhydride group by copolymerization is preferred from a perspective such as mechanical properties. The form of the copolymerization may be block copolymerization, graft copolymerization, or the like, but is preferably random copolymerization from the perspective of that the steady contact with the first layer and the mechanical strength of the laminate can be improved.

Examples of the monomer having a carboxyl group and/or an acid anhydride group (acid modification monomer) include unsaturated monocarboxylic acids such as (meth)acrylic acid and crotonic acid; and unsaturated dicarboxylic acids or acid anhydrides thereof, such as (anhydrous) maleic acid, fumaric acid, (anhydrous) citraconic acid, and (anhydrous) itaconic acid. These monomers may be used alone or in a combination of two or more. Of these monomers, unsaturated monocarboxylic acids such as (meth)acrylic acid are preferred, and methacrylic acid is particularly preferred.

A concentration (unit: mmol/kg) of the carboxyl group of the acid-modified poly(meth)acrylic resin is not particularly limited, and may be 100 or greater, and is, for example, from 100 to 1000, preferably from 200 to 900, and further preferably from 300 to 800, more preferably from 400 to 800, and most preferably from 500 to 700.

In the present specification and claims, the concentration of the carboxyl group in the acid-modified poly(meth)acrylic resin can be measured by a commonly used method, for example, a method by $^1$H-NMR or a titration method. In a preferred method, the carboxyl group concentration can be measured by dissolving an acid-modified (meth)acrylic resin (sample) in benzyl alcohol to prepare a 1 mass % solution, and then performing neutralization titration with a 1/100 N KOH ethanol solution.

Among the acid-modified poly(meth)acrylic resins, the acid-modified polymethylmethacrylate resin is particularly preferably an acid-modified polymethylmethacrylate resin having only a carboxyl group as a polar group or a reactive group other than a methyl ester group, and may be an acid-modified polymethylmethacrylate resin containing no carboxylic acid anhydride group, or an acid-modified polymethylmethacrylate resin containing no imide ring. The acid-modified polymethylmethacrylate resin containing a carboxyl group and no acid anhydride group is preferred in terms of optical properties such as high transparency and less discoloration, and the acid-modified polymethylmethacrylate resin containing a carboxyl group and no imide ring is preferred in terms of less discoloration and adhesion thereof with other materials.

A number average molecular weight of the acid-modified poly(meth)acrylic resin (particularly, acid-modified polymethylmethacrylate resin) may be, for example, from 60000 to 900000, preferably from 70000 to 800000, and further preferably from 90000 to 750000. If the molecular weight is excessively small, the mechanical properties may be impaired, and, conversely, if the molecular weight is excessively large, the productivity of the laminate may be impaired.

Note that, in the present specification and claims, the number average molecular weight of the acid-modified poly(meth)acrylic resin can be measured by gel permeation chromatography or the like using polymethylmethacrylate as a standard substance.

A melting point of the acid-modified poly(meth)acrylic resin (particularly, acid-modified polymethylmethacrylate resin) is, for example, from 150 to 350° C., preferably from 180 to 300° C., further preferably from 180 to 280° C., more preferably from 200 to 270° C., and most preferably from 220 to 250° C. If the melting point is excessively low, heat resistance may be impaired, and, conversely, if the melting point is excessively high, the productivity of the laminate may be impaired.

Note that, in the present specification and claims, the melting point of the acid-modified poly(meth)acrylic resin can be measured by a differential scanning calorimeter (DSC), and when a plurality of peaks are shown by a DSC, the melting point refers to the temperature corresponding to the highest peak on the high temperature side of the plurality of peaks.

A Vicat softening point of the acid-modified poly(meth)acrylic resin (particularly, acid-modified polymethylmethacrylate resin) is, for example, from 50 to 250° C., preferably from 80 to 200° C., further preferably from 90 to 150° C., more preferably from 100 to 130° C., and most preferably from 110 to 120° C. If the softening point is excessively low, rigidity may be impaired, and, conversely, if the softening point is excessively high, the productivity of the laminate may be impaired.

Note that, in the present specification and claims, the Vicat softening point of the acid-modified poly(meth)acrylic resin can be measured in accordance with ISO306 (B50 method).

A glass transition temperature (Tg) of the acid-modified poly(meth)acrylic resin (particularly, acid-modified polymethylmethacrylate resin) is, for example, from 50 to 170° C., preferably from 80 to 160° C., further preferably from 100 to 150° C., more preferably from 110 to 140° C., and most preferably from 120 to 130° C. If the glass transition temperature is excessively low, rigidity may be impaired, and, conversely, if the glass transition temperature is excessively high, the productivity of the laminate may be impaired.

Note that, in the present specification and claims, the glass transition temperature of the acid-modified poly(meth)acrylic resin can be measured in accordance with ISO11357.

A proportion of the acid-modified (meth)acrylic resin in the second resin may be 10 mass % or greater, preferably 30 mass % or greater, further preferably 50 mass % or greater, more preferably 80 mass % or greater, and most preferably 90 mass % or greater, and may be 100 mass %. If the proportion of the acid-modified (meth)acrylic resin is excessively small, the steady contact of the laminate may be impaired.

The second resin may further include another resin in addition to the acid-modified (meth)acrylic resin. Another resin can be selected from general-purpose thermoplastic resins, but, from the perspective of compatibility, the (meth)acrylic resin (non-modified (meth)acrylic resin) is preferred, and the polymethacrylate resin (non-modified polymethylmethacrylate resin) is particularly preferred. The proportion of another resin may be 90 mass % or less, preferably 70 mass % or less, further preferably 50 mass % or less, more preferably 30 mass % or less, and most preferably 10 mass % or less in the second resin.

The non-modified (meth)acrylic resin such as the non-modified polymethylmethacrylate resin may be blended to adjust the concentration of the carboxyl group in the second resin, and, when another resin is blended, a combination of the acid-modified polymethylmethacrylate resin and the non-modified polymethylmethacrylate resin is particularly preferred.

As the non-modified polymethylmethacrylate resin, a resin exemplified as the polymethylmethacrylate resin constituting the acid-modified polymethylmethacrylate resin can be used. Furthermore, the proportions of another copolymerizable unit and the methyl methacrylate unit are also similar to the polymethylmethacrylate resin constituting the acid-modified polymethylmethacrylate resin, including preferred aspects.

A number average molecular weight of the non-modified polymethylmethacrylate resin is, for example, from 60000 to 900000, preferably from 70000 to 800000, and further preferably from 90000 to 750000. If the molecular weight is excessively small, the mechanical properties may be impaired, and, conversely, if the molecular weight is excessively large, the productivity of the laminate may be impaired.

A melting point of the non-modified polymethylmethacrylate resin is, for example, from 150 to 350° C., preferably from 180 to 300° C., further preferably from 180 to 280° C., more preferably from 200 to 270° C., and most preferably from 220 to 260° C. If the melting point is excessively low, heat resistance may be impaired, and, conversely, if the melting point is excessively high, the productivity of the laminate may be impaired.

A Vicat softening point of the non-modified polymethylmethacrylate resin is, for example, from 50 to 250° C., preferably from 80 to 200° C., further preferably from 90 to 150° C., more preferably from 100 to 120° C., and most preferably from 105 to 110° C. If the softening point is excessively low, rigidity may be impaired, and, conversely, if the softening point is excessively high, the productivity of the laminate may be impaired.

A glass transition temperature (Tg) of the non-modified polymethylmethacrylate resin is, for example, from 50 to 170° C., preferably from 80 to 160° C., further preferably from 90 to 150° C., more preferably from 95 to 130° C., and most preferably from 100 to 120° C. If the glass transition temperature is excessively low, rigidity may be impaired, and, conversely, if the glass transition temperature is excessively high, the productivity of the laminate may be impaired.

Note that, in the present specification and claims, the number average molecular weight, melting point, glass transition temperature, and Vicat softening point of the non-modified polymethylmethacrylate resin can be measured by the same methods as those for the acid-modified polymethylmethacrylate resin.

The concentration (unit: mmol/kg) of the carboxyl group of the second resin is not particularly limited, and may be 100 or greater, and is, for example, from 100 to 1000, preferably from 200 to 900, and further preferably from 300 to 800, more preferably from 400 to 800, and most preferably from 500 to 700.

Note that, in the present specification and claims, the carboxyl group concentration of the second resin can be measured by a commonly used method, for example, a titration method. Specifically, the carboxyl group concentration can be measured by dissolving a second resin (a mixed resin as a sample when the second resin is a combination of the acid-modified polymethylmethacrylate resin and the non-modified polymethylmethacrylate resin) in benzyl alcohol to prepare a 1 mass % solution, and then performing neutralization titration with a 1/100 N KOH ethanol solution.

A proportion of the second resin in the second resin composition may be 70 mass % or greater, preferably 80 mass % or greater, further preferably 90 mass % or greater, more preferably 95 mass % or greater, and most preferably 99 mass % or greater, and may be 100 mass %. If the proportion of the second resin is excessively small, rigidity may be impaired.

The second resin composition may further contain commonly used additives in addition to the second resin. Examples of commonly used additives include stabilizers (heat resistant stabilizers, weather resistant stabilizers, antioxidants, ultraviolet absorbers, and the like), colorants, fillers, plasticizers, lubricants, flame retardants, antistatic agents, and silane coupling agents. These additives can be used alone or in a combination of two or more. The total proportion of these additives may be 30 mass % or less (for example, from 0.01 to 10 mass %) in the second resin composition.

The average thickness of the second layer is preferably 250 μm or greater from the perspective that rigidity can be improved. In particular, the average thickness of the second layer can be appropriately selected according to the intended use, and is, for example, from 0.25 to 50 mm, preferably from 0.3 to 30 mm, further preferably from 0.5 to 10 mm, more preferably from 0.6 to 5 mm, and most preferably from 0.8 to 3 mm.

Properties of Laminate

In the laminate of the present disclosure, the average thickness of the first layer may be 0.15 times or more (e.g., from 0.2 to 30 times), and is, for example, from 0.3 to 25 times, preferably from 0.5 to 20 times, further preferably from 1 to 10 times, more preferably from 1.5 to 5 times, and most preferably from 2 to 4 times of the average thickness of the second layer. If the average thickness of the first layer with respect to the second layer is excessively thin, impact resistance may be impaired, and, conversely, if the average thickness is excessively thick, rigidity may be impaired.

The laminate of the present disclosure has anisotropy in impact resistance on the first layer side and the second layer side. Specifically, the laminate of the present disclosure has higher impact resistance on the second layer side than that on the first layer side, and thus is suitable for uses that are susceptible to impact from the second layer side. Therefore, for example, when the laminate of the present disclosure is used as a partition wall for separating indoors from outdoors (particularly, when the laminate is used as an automobile sunroof), the laminate is preferably used in a state where the second layer is disposed on the outdoor side. Note that, as compared with the alicyclic polyamide resin constituting the first layer, the poly(meth)acrylic resin represented by PMMA constituting the second layer is fragile and cracks easily, and has low impact resistance, and thus the property that the laminate of the present disclosure has higher impact resistance on the second layer side than that on the first layer side is a heterogeneous property in the art.

In the laminate of the present disclosure, the DuPont impact strength, when a weight is dropped onto the second layer, may be 300 N/inch or greater, for example, 500 N/inch or greater, preferably 700 N/inch or greater, further preferably 800 N/inch or greater, more preferably 1000 N/inch or greater, and most preferably 1200 N/inch or greater (e.g., from 1200 to 2000 N/inch).

Note that, in the present specification and claims, the DuPont impact strength of the laminate can be measured by the method described in the Examples described later.

Furthermore, in the laminate of the present disclosure, a peel test for indicating steady contact strength between the first layer and the second layer is difficult to measure because the second layer is fragile to bending and cracks easily. Therefore, in the laminate of the present disclosure, the steady contact between the first layer and the second layer is evaluated by the Dupont impact strength when a weight is dropped onto the second layer side.

The laminate of the present disclosure has high rigidity and thus is less bent, and can also be suitably used as an automobile sunroof or the like. A bending elastic modulus of the laminate (4 mm thick) of the present disclosure may be 2000 MPa or greater, and is preferably 2400 MPa or greater, and further preferably 2700 MPa or greater (e.g., approximately from 2700 to 3600 MPa).

Note that, in the present specification and claims, the bending elastic modulus can be measured by the method described in the Examples described later.

The laminate of the present disclosure may have a hard coat layer layered on the second layer, the hard coat layer being formed of a cured product of a curable composition containing a curable (meth)acrylic resin. The second layer contains the acid-modified (meth)acrylic resin, and thus high affinity (wettability) for the hard coat layer, and the hard coat layer can be firmly steady-contacted onto the second layer.

As the curable (meth)acrylic resin of the hard coat layer, for example, a (meth)acrylate having 2 or more (e.g., approximately from 2 to 8) (meth) acryloyl groups in the molecule is used widely, and, from the perspective of strength, a trifunctional or higher functional (meth)acrylate (e.g., pentaerythriol tri or tetra(meth)acrylate, or dipentaerythritol penta or hexa(meth)acrylate) is preferred.

The average thickness of the hard coat layer is, for example, from 0.5 to 30 μm, preferably from 0.8 to 20 μm, and further preferably from 1 to 10 μm.

The laminate of the present disclosure may have another functional layer instead of the hard coat layer, another functional layer may be layered between the hard coat layer and the second layer, or another functional layer may be layered on the first layer. Examples of another functional layer include optical layers such as anti-reflective layers and anti-glare layers, and printed layers.

Method for Producing Laminate

The laminate of the present disclosure may be produced by bringing a first precursor (first resin composition) for forming the first layer and a second precursor (second resin composition) for forming the second layer into contact with each other in a state where at least one of the first precursor and the second precursor is molten, and solidifying the precursors. Specifically, the laminate may be produced by heating and melting at least one of the first precursor and the second precursor, bringing the first precursor and the second precursor into contact with each other in a state where at least one of the first precursor and the second precursor is molten, and joining the first precursor and the second precursor.

A specific joining method may be, for example, a method of joining the first precursor and the second precursor in a molding process by a commonly used molding method such as thermoforming (thermal press molding, injection press molding, or the like), injection molding (insert injection molding, two-color injection molding, core back injection molding, sandwich injection molding, or the like), extrusion molding (co-extrusion molding, T-die lamination molding, or the like), or blow molding.

For example, in a molding method such as insert injection molding or injection press molding, the first precursor and the second precursor may be joined by heating and melting the first precursor and molding the precursors while bringing the first precursor in a molten state into contact with the second precursor, or by heating and melting the second precursor and molding the precursors while bringing the second precursor in a molten state into contact with the first precursor. In addition, in a molding method such as two-color injection molding, co-extrusion molding, or the like, the first precursor and the second precursor may be joined by heating and molding each of the first precursor and the second precursor and molding the precursors while bringing the first precursor in a molten state and the second precursor in a molten state into contact with each other. A laminate in which the first layer and the second layer are firmly joined can be obtained by melting at least either one of the first precursor and the second precursor, bringing the precursors into contact with each other, joining the precursors, and then normally cooling the joined product.

More specifically, in the thermal press molding, a molded article can be produced by melting at least one of the first precursor and the second precursor in a press molding mold, bringing the precursors into contact with each other, pressurizing the precursors, and joining the precursors.

In the insert injection molding method, a laminate can be produced by molding either one of the first precursor and the second precursor by a molding method such as injection molding, extrusion molding, sheet molding, or film molding, housing the shaped sheet-shaped precursor in a mold, and then injection-molding the other precursor into a gap between the precursor and the mold. In the insert injection molding, the sheet-shaped precursor to be housed in the mold is preferably preheated.

In the two-color injection molding method, a laminate can be produced by injection-molding either one component of the first precursor and the second precursor into a mold using two or more injection molding machines, replacing a cavity of the mold by rotation or movement of the mold, and injection-molding the other precursor into a gap formed between the obtained sheet-shaped precursor and the mold.

In the core back injection molding method, a laminate can be produced by injection-molding either one component of the first precursor and the second precursor into a mold, expanding a cavity volume of the mold, and injection-molding the other precursor into a gap formed between the obtained sheet-shaped precursor and the mold.

Among these molding methods, a thermal press molding method such as an injection press molding method, and an injection molding method (an insert injection molding method, a two-color injection molding method, a core back injection molding method, a sandwich injection molding method, or the like) are preferred from the perspective of productivity and the like.

Note that the precursor can be molten by being heated to a temperature not lower than the melting point(s) of the alicyclic polyamide resin and/or the acid-modified (meth) acrylic resin (in particular, the melting point of the resin having a higher melting point). However, in the case of a resin that does not substantially crystallize, the precursor can be molten by being heated to a temperature not lower than the glass transition point (Tg) of the resin.

In thermal fusing, the heating temperature (e.g., cylinder temperature) can be selected depending on the type of resin forming the precursor, for example, from 200 to 350° C., preferably from 250 to 320° C., and further preferably from 260 to 300° C.

Also, each aspect disclosed in the present specification can be combined with any other feature disclosed herein.

EXAMPLES

Hereinafter, the present invention is described in greater detail based on examples, but the present invention is not limited to these examples. The following materials were used in the following examples and comparative examples.

Alicyclic Polyamide Resin

Alicyclic polyamide A: a condensate of dodecanedioic acid and bis(4-aminocyclohexyl)methane, amino group concentration: 80 mmol/kg, carboxyl group concentration: 50 mmol/kg, number average molecular weight: 15384 (determined from the terminal group amount determined by a titration method, based on the calculation formula: $1 \div ((50+80)/2) \times 1000000$; the same applies hereinafter)

Alicyclic polyamide B: a condensate of dodecanedioic acid and bis(4-aminocyclohexyl)methane, amino group concentration: 50 mmol/kg, carboxyl group concentration: 90 mmol/kg, number average molecular weight: 14286

Alicyclic polyamide C: a condensate of dodecanedioic acid and bis(4-aminocyclohexyl)methane, amino group concentration: 30 mmol/kg, carboxyl group concentration: 100 mmol/kg, number average molecular weight: 15385

Alicyclic polyamide D: a condensate of dodecanedioic acid and bis(4-aminocyclohexyl)methane, amino group concentration: 10 mmol/kg, carboxyl group concentration: 110 mmol/kg, number average molecular weight: 16667

Polymethylmethacrylate Resin

Acid-modified polymethylmethacrylate (acid-modified PMMA): "PLEXIGLAS (registered trademark) FT15 clear" available from Daicel-Evonik Ltd., carboxyl group concentration: 600 mmol/kg Polymethylmethacrylate (non-modified PMMA): "PLEXIGLAS (registered trademark) 8N clear" available from Daicel-Evonik Ltd., carboxyl group concentration: 5 mmol/kg Example 1

A flat plate of the alicyclic polyamide A (20 mm thick× 100 mm×100 mm) was set in an injection molding mold, and the acid-modified PMMA was molten at 280° C. and injected into the mold to obtain a 25 mm thick laminate.

Example 2

A flat plate (20 mm thick×100 mm×100 mm) of the alicyclic polyamide A was set in an injection molding mold, and a resin obtained by dry-blending the acid-modified PMMA and the non-modified PMMA as the polymethylmethacrylate resins at a blend ratio of the acid-modified PMMA:the non-modified PMMA=1:2 (mass ratio) was molten at 280° C. and injected into the mold to obtain a 30 mm thick laminate.

Example 3

A flat plate of the alicyclic polyamide B (30 mm thick× 100 mm×100 mm) was set in an injection molding mold, and the acid-modified PMMA was molten at 280° C. and injected into the mold to obtain a 31.5 mm thick laminate.

Example 4

Using two extruders a and b, the alicyclic polyamide C was charged into the extruder a, and heated to 280° C., and the acid-modified PMMA was charged into the extruder b, and heated to 280° C. They were joined in a T-die to obtain a laminate having a thickness ratio of the alicyclic polyamide C and the acid-modified PMMA of 1:1 (total thickness: 8 mm).

Example 5

A flat plate of the acid-modified PMMA (20 mm thick× 100 mm×100 mm) was set in an injection molding mold, and the alicyclic polyamide B was molten at 280° C. and injected into the mold to obtain a 24 mm thick laminate.

Comparative Example 1

A 25 mm thick laminate was obtained in the same manner as in Example 1, except that a flat plate of the alicyclic polyamide D (20 mm thick×100 mm×100 mm) was set in an injection molding mold.

Comparative Example 2

A 24 mm thick laminate was obtained in the same manner as in Example 5, except that a flat plate of the non-modified PMMA (20 mm thick×100 mm×100 mm) was set in an injection molding mold.

For each of the laminates obtained in Examples 1 to 5 and Comparative Examples 1 and 2, the DuPont impact strength was measured and evaluated by the following method.

DuPont Impact Strength

For the obtained laminates, in accordance with the DuPont impact strength measurement method of ASTM D 2794, a weight having a constant weight was dropped while the height of the weight was changed under the following conditions, and 50% fracture energy of the obtained films was determined based on the presence or absence of fracture, and evaluated according to the following criteria. The weight was dropped onto the surface on the second layer side formed of the acid-modified PMMA or the like.

Conditions

Weight tip diameter: 15.9 mm, cradle: 16.3 mm, weight of weight: 0.5 kg.

Evaluation Criteria

○: 500 N/inch or greater
x: less than 500 N/inch
The results are shown in Table 1.

TABLE 1

|  | Examples | | | | | Comparative Examples | |
|---|---|---|---|---|---|---|---|
|  | 1 | 2 | 3 | 4 | 5 | 1 | 2 |
| First layer (alicyclic polyamide) amino group concentration (mmol/kg) | 80 | 80 | 50 | 30 | 50 | 10 | 10 |
| Second layer (PMMA-based) carboxyl group concentration (mmol/kg) | 600 | 200 | 600 | 600 | 600 | 600 | 5 |
| Thickness ratio (first layer/second layer) | 4/1 | 2/1 | 20/1 | 1/1 | 1/5 | 4/1 | 1/5 |
| DuPont impact strength (fracture height) | Good | Good | Good | Good | Good | Poor | Poor |

As is clear from the results in Table 1, the laminates of the Examples had high impact resistance, and the first layer and the second layer were firmly adhered to obtain integrated laminates, whereas the laminates of the Comparative Example had low impact resistance.

Example 6

Laminates (laminates of a first layer formed of the alicyclic polyamide B and a second layer formed of the acid-modified PMMA) having a total thickness of 4 mm, 3 mm, and 2 mm were produced using the alicyclic polyamide B and the acid-modified PMMA in the same manner as in Example 3 except that the thicknesses were changed as shown in Table 2. The following three-point bending test was evaluated, and also the DuPont impact strength was evaluated in the same manner as in Example 3. In addition, a single layer of the alicyclic polyamide B and a single layer of the acid-modified PMMA are also described as comparative products. Furthermore, in Table 2, "upper" and "lower" in each laminate indicate which of the first layer and the second layer in the evaluation test is evaluated as the upper or lower layer. That is, for the DuPont impact strength, the weight was dropped onto the upper layer, and thus the weight was dropped not only onto the surface of the second layer, but also onto the surface of the first layer unlike Examples 1 to 5 and Comparative Examples 1 and 2.

Three-Point Bending Test

In accordance with JIS K7171, the elastic modulus, the maximum point, the maximum point displacement strain, and the maximum displacement strain were measured using a sample having a width of 25 mm under the conditions: a span distance of 64 mm and a compression speed of 2 mm/min.

The results are shown in Table 2.

TABLE 2

| Total thickness | Layer configuration | Three-point bending test | | | | DuPont impact strength |
|---|---|---|---|---|---|---|
| | | Elastic modulus (MPa) | Maximum point (MPa) | Maximum point displacement strain (%) | Maximum displacement strain (%) | |
| 4 mm | Second layer alone | 3770 | 122 | 4 | 4 | Poor |
| | Second layer (upper) 1 mm/first layer (lower) 3 mm | 2860 | 127 | 7 | 13< | Good |
| | Second layer (upper) 2 mm/first layer (lower) 2 mm | 2910 | 128 | 7 | 12< | Good |
| | Second layer (upper) 3 mm/first layer (lower) 1 mm | 3100 | 135 | 7 | 12< | Good |
| | First layer (upper) 1 mm/second layer (lower) 3 mm | 3020 | 126 | 6 | 6 | Poor |
| | First layer (upper) 2 mm/second layer (lower) 2 mm | 2920 | 128 | 6 | 6 | Poor |
| | First layer (upper) 3 mm/second layer (lower) 1 mm | 2880 | 118 | 5 | 5 | Poor |
| | First layer alone | 1855 | 94 | 8 | 10< | Good |
| 3 mm | Second layer alone | 3770 | 124 | 5 | 5 | Poor |
| | Second layer (upper) 1 mm/first layer (lower) 2 mm | 2360 | 98 | 7 | 16< | Good |
| | First layer (upper) 2 mm/second layer (lower) 1 mm | 2380 | 97 | 7 | 9 | Poor |
| | First layer alone | 1630 | 74 | 7 | 10< | Good |
| 2 mm | Second layer alone | 3850 | 112 | 5 | 9< | Good |
| | Second layer (upper) 1 mm/first layer (lower) 1 mm | 2380 | 82 | 5 | 13< | Good |
| | First layer (upper) 1 mm/second layer (lower) 1 mm | 2350 | 80 | 5 | 10 | Poor |
| | First layer alone | 1650 | 60 | 5 | 8< | Good |

As is clear from the results in Table 2, the amount of displacement to fracture was greatly improved when the second layer was positioned on the upper side as compared with when the first layer was positioned on the upper side (for DuPont impact strength, a weight was dropped on the surface on the second layer side).

INDUSTRIAL APPLICABILITY

The laminate of the present disclosure can be used for molded articles in various fields requiring transparency, for example, daily necessities, containers, electrical and electronic equipment parts, optical sheets, lenses, structural members of vehicles (transportation equipment or transportation means), building materials, and the like. Especially, the laminate of the present disclosure has excellent light resistance, and thus is preferably used as a partition wall for separating indoors from outdoors in vehicles, buildings, and the like, and is particularly preferably used as windows and partition plates (particularly, sunroofs of automobiles) of vehicles such as cars (such as automobiles), trains, airplanes or aircraft, and ships.

The invention claimed is:

1. A laminate comprising a first layer and a second layer, the first layer comprising a first resin composition containing a first resin, the second layer comprising a second resin composition containing a second resin, the first layer and the second layer being in contact with each other and integrated, wherein the first resin comprises an alicyclic polyamide resin having 20 mmol/kg or greater of amino groups, and the second resin comprises an acid-modified (meth)acrylic resin having 100 mmol/kg or greater of carboxyl groups.

2. The laminate according to claim 1, wherein the acid-modified (meth)acrylic resin is an acid-modified polymethylmethacrylate resin.

3. The laminate according to claim 1, wherein the first layer has an average thickness 0.15 times or more of an average thickness of the second layer.

4. The laminate according to claim 1, wherein the first layer has the average thickness of 200 μm or greater.

5. The laminate according to claim 1, wherein, when a weight is dropped onto the second layer side, a DuPont impact strength is 500 N/inch or greater.

6. A method for producing the laminate described in claim 1, comprising solidifying by bringing a first precursor for forming a first layer and a second precursor for forming a second layer into contact with each other in a state where at least one of the first precursor or the second precursor is molten to obtain a laminate.

7. A molded article comprising the laminate described in claim 1.

8. The molded article according to claim 7, which is an automobile sunroof with the second layer disposed on an outdoor side.

9. A method of using the laminate described in claim 1 as a partition wall configured to separate indoors from outdoors, the method comprising disposing the second layer on the outdoor side.

10. The laminate according to claim 1, wherein the acid-modified (meth)acrylic resin has a melting point of 150 to 350° C., a Vicat softening point of 50 to 250° C., and a glass transition temperature of 50 to 170° C.

11. The laminate according to claim 2, wherein a proportion of a methyl methacrylate unit is 70 mol % or greater in a polymethylmethacrylate resin constituting the acid-modified (meth)acrylic resin.

12. The laminate according to claim 1, which is used as a partition wall for separating indoors from outdoors in vehicles.

* * * * *